United States Patent Office 2,885,385
Patented May 5, 1959

2,885,385
POLYPHENYLOL DERIVATIVES OF OLEFINIC ALDEHYDES

Alford G. Farnham, Caldwell, N.J., assignor to Union Carbide Corporation, a corporation of New York No Drawing. Application July 16, 1953
Serial No. 368,514

7 Claims. (Cl. 260—55)

This invention relates to novel polyphenylols and their production. More particularly, this invention is concerned with polyphenylols obtained by reacting an olefinic aldehyde such as acrolein with a monohydric phenol as typified by phenol and its homologues.

It has been previously proposed to react phenol with acrolein in various molar ratios and in the presence of acid or basic catalysts to form resins capable of heat-hardening to an infusible form. It has also been proposed to make oil-soluble resins from phenol and acrolein by reacting at least 1.5 mols of acrolein with a mol of phenol in the presence of limited amounts of sulphuric acid. The products obtained by the above and like proposals are all to the best of my knowledge relatively complex resinous products. In attempting to form epoxy derivatives of these resinous products by reaction of the phenolic hydroxyl groups in these products with an excess of epichlorohydrin and in the presence of caustic soda to remove chlorine, the resultant polyglycidyls usually form rubbery gels either during the course of the reaction, the gelation being promoted by the caustic soda, or during purification to remove caustic soda as by washing with water or other solvents and then heating enough to volatilize off the solvent. This susceptibility to gelation of epoxy derivatives prepared from the phenol-acrolein resins of the prior art is believed due largely to the multiplicity of phenolic hydroxyl groups present in such resins, their average number per molecule being estimated as being in the range of from 11 to more than 30.

It has now been found that by reacting in the presence of an acid catalyst, a molar amount of an olefinic aldehyde having the formula $C_nH_{2n-1}CHO$ where $n$ is a whole number from two to six with at least three mols of a monohydric phenol having only one active nuclear position, or at least about five mols in the instance of monohydric phenols having two or three active nuclear positions, that one obtains satisfactory yields of relatively low molecular weight polyphenylols comprising triphenylols in which three phenolic nuclei are linked together by a single tervalent aldehyde residue

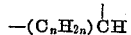

pentaphenylols in which five phenolic nuclei are linked together by two tervalent aldehyde residues, and heptaphenylols in which seven phenolic nuclei are linked together by three tervalent aldehyde residues. Otherwise stated, the polyphenylols of this invention consist of $2x+1$ phenylol groups linked together by $x$ tervalent groups having the formula

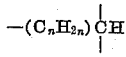

$x$ being one when the polyphenylol is prepared from a monohydric phenol having only one active position, and $x$ being a whole number from 1 to 3 when the polyphenylol is prepared from a monohydric phenol having at least two active nuclear positions.

The triphenylols, for example, derived from phenol and acrolein are believed to exist in either or both of the following isomeric configurations:

(1) 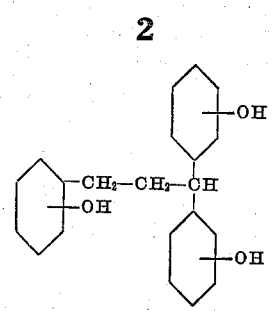

or (2) 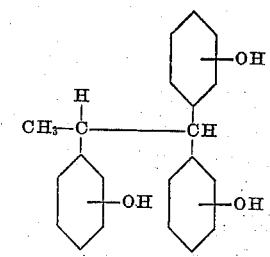

The OH groups in the above configurations are either in an ortho or para position with respect to a carbon atom in the tervalent aldehyde residue that is attached to the phenolic nuclei.

The pentaphenylols are also considered as having repeating aldehyde linkages, the same as in either structure depicted for the triphenylols, that is both linkages may be the same, or one linkage can be of one type and the second linkage of the other type, this mixed type of linkage being depicted below.

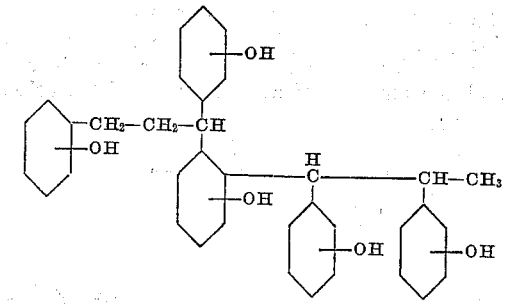

The heptaphenylols, like the triphenylols and pentaphenylols have seven phenylol groups linked together by three aldehyde residues in either of the two isomeric manners indicated above. The following structure is believed generically typical of the heptaphenylols of this invention.

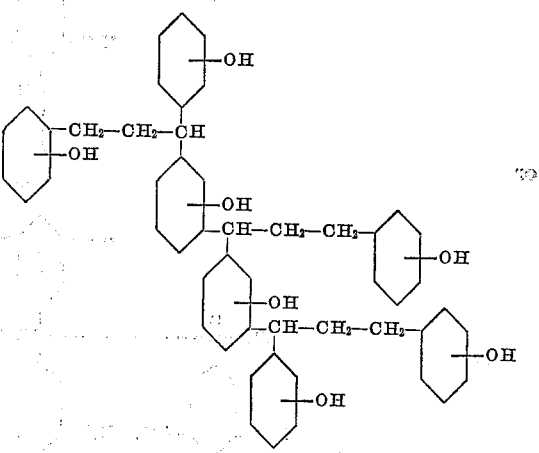

These novel polyphenylols can be readily converted to polyglycidyl ethers or epoxy compounds by reaction with epichlorhydrin or other glycol chlorhydrin in the presence of caustic soda, and the resultant epoxy compounds can be purified as by washing with water to remove caustic soda and chloride salts to thermoplastic products, which are stable at room temperature, but will slowly heat-convert at temperatures of about 150° C. The purified epoxy compounds can be converted to thermoset resinous masses as by prolonged heating, or more rapidly by adding thereto a basic or acidic catalyst such as caustic soda, amines or sulphuric acid, or by reaction with a polyfunctional organic compound having a labile hydrogen atom on the functional group as for example polyols, such as ethylene glycol and glycerol, polythiols, polycarboxylic acids and anhydrides such as phthalic acid and anhydride, maleic anhydride, and adipic acid, polyamines and polyhydric phenols. In general, the resultant thermoset epoxy products are characterized by considerably higher heat-distortion values than similar thermoset products derived from epoxy compounds of polyhydric mononuclear phenols, such as resorcinol, hydroquinone and polyhydric polynuclear phenols such as the isomeric dihydroxy diphenyl methanes and dihydroxy diphenyl monoalkyl and dialkyl methanes.

The production of triphenylol, pentaphenylol or heptaphenylol derivatives of monohydric phenols and olefinic aldehydes in the instance of phenols having more than one active position on the phenolic nucleus is basically dependent upon reaction conditions insuring a considerable molar excess of the phenol reactant over that theoretically required to produce the desired polyphenylol derivative. But phenols having only one active nuclear position, such as 2,6-xylenol when reacted to completion with an olefinic aldehyde inherently form only triphenylol derivatives, which often can be isolated in crystalline form, and these can be produced in good yields by reacting together stoichiometrical proportions of the phenol and the aldehyde, namely 3 mols of phenol and one mol of aldehyde. For example, the two possible triphenylol isomers obtained by reacting together 3 mols of 2,6-xylenol and one mol of acrolein are depicted below:

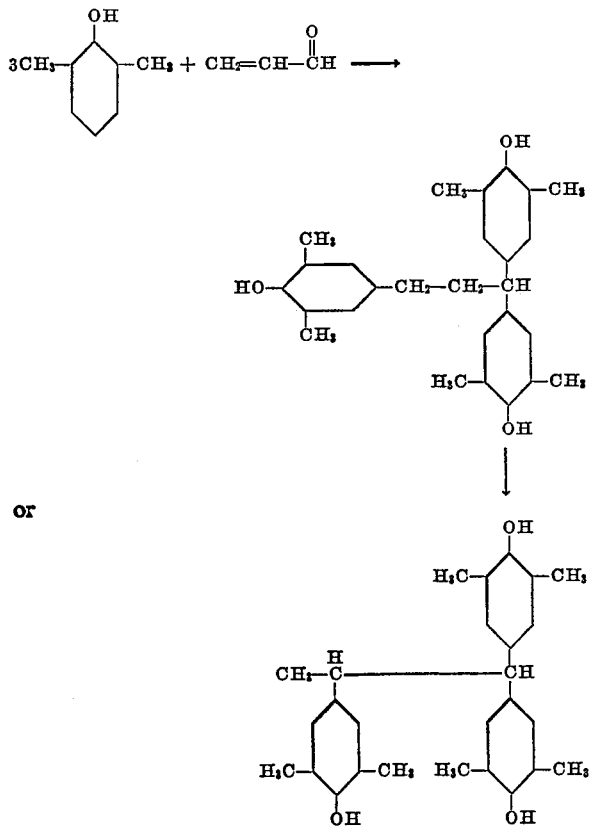

The triphenylol, pentaphenylol and heptaphenylol derivatives of monohydric phenols having two or three active nuclear positions as exemplified respectively by para cresol para tertiary butyl phenol, meta-cresol or phenol cannot be obtained by directly reacting together the calculated theoretically equivalent proportions of the phenol and the olefinic aldehyde because in such reactant proportions the aldehyde, while conceivably at first forming the desired phenylols, immediately before any isolation of such phenylols is possible, the aldehyde proceeds to react further with such phenylols to form complex molecules averaging more than 11 phenolic nuclei in size.

In order to obtain the tri-, penta-, or hepta-phenylol derivatives of monohydric phenols having more than one active nuclear position, I have found that in practically all instances it is necessary to react the aldehyde with at least 1.6 theoretical equivalent amounts of phenol whereby there is obtained reaction products which usually are a mixture of triphenylols, pentaphenylols and heptaphenylols. However, to secure a practical yield high in triphenylol derivatives of such phenols, reaction ratios of up to 10 and more mols of the phenol per mol of aldehyde are necessary. Employing such high mol ratios of phenol to aldehyde, as 10:1 the reaction can be initiated merely by mixing together such amounts of phenol and aldehyde with an acid catalyst and, if necessary, heating the mixture to moderate temperatures, e.g. 30–60° C. and if desired up to the boiling point of the mixture.

On the other hand, with phenols having two or more active nuclear positions and using reactant proportions of such phenol only about twice that or somewhat more of that theoretically required, it has been found necessary to add the olefinic aldehyde to the phenol at a rate avoiding a violent exothermic reaction leading to the formation of undesired higher molecular weight products. For example, by slowly adding 3 gram mols of acrolein to fifteen gram mols of phenol ($C_6H_5OH$) at 45° C. and containing as catalyst 1.8 cc. of concentrated hydrochloric acid, a controllable exothermic reaction ensues continuing until all of the acrolein has been added. Thereafter, the reaction products were heated under sub-atmospheric pressure to distill off unreacted phenol amounting to about 7.6 gram mols. The phenol free residue was a reddish brown fusible resin at room temperature having an average molecular weight of 700 by the Menzies-Wright method using acetone as the solvent. This molecular weight is indicative of the presence in the product of substantial amounts of the pentaphenylol isomers $C_{36}H_{33}O_5$ (M.W. 545) and the heptaphenylol isomers $C_{51}H_{46}O_7$ (M.W. 770).

Any monohydric phenol having at least one active nuclear position, can be used to react with an olefinic aldehyde to form polyphenylols as herein described. The substituents, if any, on the phenolic nuclei should be non-reactive groups such as alkyl or phenyl. Specific phenols which can be employed as reactants to prepare the polyphenylols herein described include among others phenol, and its numerous alkyl homologues, such as any of the isomeric cresols, xylenols, the mono, di, and triethyl phenols, butyl phenols, amyl phenols, octyl phenols, nonyl phenols, and para-phenyl phenol.

The olefinic aldehydes useful in reaction with a suitable monohydric phenol to form polyphenylols have the formula $C_nH_{2n-1}CHO$ wherein $n$ is an integer for 1 to 6. Aldehydes coming within this formula include acrolein, alkyl substituted acroleins as for example methyl acrolein and ethyl acrolein, crotonaldehyde, alpha hexenaldehyde and tiglic aldehyde.

To promote high yields of the desired polyphenylols and effect rapid reactions, the reaction is conducted in the presence of catalytic amounts of a strong acid, particularly hydrochloric acid, either in gaseous form or as a concentrated aqueous solution. Other acids useful as catalysts include sulphuric acid, phosphoric acid, the aromatic sulfonic acids, such as toluene sulphonic acid, and acid salts such as aluminum chloride, and acid potassium sulfate.

The invention is more specifically illustrated in the examples hereinafter submitted.

Example 1

A mixture of 470 grams (5 mols) phenol and 19.5 grams (⅓ mol) of acrolein and 0.3 cc. concentrated hydrochloric acid (37.5%) was allowed to react exothermically, the temperature rising from room temperature to 78° C.; thereafter the reaction products were heated for one hour at 100° C. to insure completion of the reaction. Unreacted phenol was then removed by distilling the reaction products under reduced pressure (10–12 mm. Hg) to a temperature of 200° C. (thermometer bulb in residue in flask). A yield of crude triphenylol products amounting to 99.4 grams was obtained, or 93% of theoretical (based on a triphenylol of M. W. 320). A sample of this crude triphenylol product (a brittle fusible resin at room temperature) was distilled under reduced pressure (0.4–0.5 mm. Hg) and 62% distilled between 260–290° C. leaving 35.6% residue, the distillate being a fusible resin at room temperature. There was some decomposition and splitting off of phenol during this distillation.

Analysis of the original crude product and the distilled product gave the following results:

|  | Original Crude Product | Distilled Product | Calculated for $C_{21}H_{20}O_3$ |
|---|---|---|---|
| Molecular Weight | 322 | 281 | 320 |
| Percent OH | 15.2 | 15.1 | 15.9 |

Both the crude and distilled products were soluble in ethyl alcohol and in acetone, but only slightly soluble in benzene.

Example 2

To 2820 grams (30 mols) phenol containing 1.8 cc. concentrated HCl (37%) there were added dropwise 168 grams (3 mols) acrolein at 40–45° C. The reaction was exothermic and cooling was required. It required one hour for all the acrolein to be added to the phenol. After the exothermic reaction ceased, heating was continued for one hour at 100° C. Unreacted phenol was then distilled off under reduced pressure (10–12 mm. Hg) to a temperature of 200° C. (thermometer bulb in the residue). The reddish colored residue was a liquid at 100° C. and solidified to a fusible brittle solid at room temperature. The yield was 865 grams or 90% theoretical based on an empirical formula weight of 320. Analysis of the product gave the following results: molecular weight 360, OH 15.1%; soluble in acetone and in ethyl alcohol and only slightly soluble in benzene.

Example 3

In a two-liter three-necked flask equipped with a reflux condenser, glass mechanical stirrer, dropping funnel and a thermometer extending nearly to the bottom of the flask there were placed 1410 g. (15 mols) of freshly distilled phenol and 1.8 cc. of concentrated hydrochloric acid (density 1.2). From the dropping funnel 168 g. (3 mols of acrolein were added slowly to the phenol at 40–45° C. with rapid agitation and external cooling as necessary to hold the reaction at 45° C. or less. After all the acrolein had been added, the mixture was held at 100° C. for a few minutes. The reflux condenser was replaced by a distilling head and unreacted phenol was distilled off under reduced pressure (10–12 mm. Hg) to a temperature of 204° C. (thermometer bulb in residue in flask). Recovered phenol amounted to 715 g. (7.6 mols). The residue weighing 822 g. was poured at about 180° C. onto a polished aluminum sheet and allowed to cool to a reddish brown brittle resinous solid which was soluble in ethyl alcohol and in acetone and insoluble in hexane.

Analysis of the product gave the following result:
Molecular weight 700; OH 14.0%; calculated for the triphenylol, $C_{21}H_{20}O_3$, mol. wt. 320, OH 15.9%; pentaphenylol, $C_{36}H_{33}O_5$, mol. wt. 545, OH 15.6%; heptaphenylol, $C_{51}H_{46}O_7$, mol. wt. 770, OH 15.4%.

Example 4

In a two-liter three-necked flask connected by glass joints to a glass mechanical stirrer, dropping funnel, reflux condenser, and a thermometer extending nearly to the bottom of the flask were placed 648 g. (6 mols) p-cresol and 2 cc. of concentrated hydrochloric acid (density 1.2). From the dropping funnel 56 g. (1 mol) of freshly distilled acrolein were added dropwise with rapid stirring and cooling of the reaction vessel so that a temperature of 30–40° C. was maintained over a period of fifty minutes. The dark colored mixture was heated briefly to 100° C. and then distilled under reduced pressure (50–75 mm. Hg) to a temperature of 126° C. (thermometer in residue). The glass stirrer was replaced by a stainless steel agitator and the distillation continued under reduced pressure (25 mm. Hg) to a residue temperature of 198° C. The red colored residue was poured into a pan and cooled to a brittle resinous solid at room temperature. Yield 300 g. (83% theory based on acrolein).

*Analysis.*—Calculated for $C_{24}H_{26}O_3$: Mol. wt. 362, OH 14.1%. Found: Mol. wt. 425, OH 12.5%.

A distillate of 392 g. (3.6 mols calculated as p-cresol) was recovered.

Example 5

A mixture of 190 grams (1.56 mols) 2,6-xylenol and 28 grams acrolein (0.5 mol) was dissolved in 190 grams toluene. Dry hydrogen chloride gas was bubbled into the solution for about ½ hour. The reaction was mildly exothermic becoming red in color with some separation of water. The mixture was allowed to stand for 24 hours at room temperature and then heated at 70–80° C. for one hour. The mixture was then distilled under reduced pressure (10–12 mm. Hg) to a temperature of 130° C. (thermometer bulb in residue). The residue remaining amounted to 166 grams or a yield of 82.2% based on an empirical formula weight of 404. The crude product was a red brittle, fusible solid at room temperature and soluble in toluene and in acetone. Crystallization from 70% acetic acid gave 85 grams of white crystalline material (42% yield). After recrystallizing twice more from acetic acid the crystals had a melting point of 172.5–174° C.

Analysis of the crystals gave the following results:

|  | Found | Calculated for $C_{27}H_{32}O_3$ |
|---|---|---|
| Molecular Weight | 373 | 404 |
| Percent OH | 13.2 | 12.6 |

Example 6

In a two-liter three-necked flask equipped with reflux condenser, thermometer extending nearly to the bottom of the flask, gas inlet tube and an all glass mechanical stirrer were placed 733 g. (6 mols) xylenol-2,6, 56 g. (1 mol) acrolein and 350 g. toluene. The mixture was held at 29–30° C. while gaseous hydrogen chloride was passed in over a period of one and one-half hours. The light yellow solution darkened to a red color and became black on standing two days. The reflux condenser was replaced by a distilling head and the mixture distilled under reduced pressure (20–25 mm. Hg) to a temperature of 148° C. (thermometer bulb in residue). The residue was a soft red resinous material which crystallized on remelting. It was recrystallized three times from 300–400 cc., 70% aqueous acetic acid to give a white granular product of melting point 167–169° C. The yield was 174 g. (43% based on acrolein).

*Analysis.*—Calculated for $C_{27}H_{32}O_3$: Mol. wt. 404, OH 12.6%. Found: Mol. wt. 382, OH 12.4%.

It is to be noted that in Examples 5 and 6 an inert volatile solvent, namely toluene was present in the reaction mixture. The use of such a solvent is to promote a homogeneous reaction system.

The polyphenylols of this invention as is evident from the several examples may exist in crystalline form, particularly those derived from monofunctional phenols, such as 2,6-xylenol, or as brittle, fusible resinous masses. Either mixtures of polyphenylols such as are described in Example 3 or any individual polyphenylol are suitable for reaction with epichlorhydrin to produce polyglycidyl ethers.

The polyphenylols herein described which are derived from phenols having two or more reactive positions can be reacted with more olefinic aldehyde or with a saturated aldehyde to produce thermosetting resins comparable to thermosetting phenol-formaldehyde resins.

What is claimed is:

1. A fusible, resinous polyphenylol condensation product of a monohydric phenol having more than one active nuclear position and an olefinic aldehyde having the formula $C_nH_{2n-1} \cdot CHO$ wherein $n$ is a whole number from 2 to 6, said polyphenylol containing a mixture of triphenylols, pentaphenylols, and heptaphenylols and being the reaction product resulting from the condensation reaction of at least about 5 mols of said phenol per mol of olefinic aldehyde in the presence of a catalytic amount of an acid catalyst.

2. A fusible, resinous polyphenylol condensation product of phenol and acrolein, said polyphenylol containing a mixture of triphenylols, pentaphenylols, and heptaphenylols and being the reaction product resulting from the condensation reaction of at least about 5 mols of phenol per mol of acrolein in the presence of a catalytic amount of an acid catalyst.

3. A fusible, resinous condensation product of phenol and acrolein, said product containing a mixture of triphenylols, pentaphenylols, and heptaphenylols and being the reaction product resulting from the condensation reaction of about 15 mols of phenol per mol of acrolein in the presence of a catalytic amount of an acid catalyst.

4. Process for preparing polyphenylol condensation products from monohydric phenols and olefinic aldehydes which comprises reacting together in the presence of a catalytic amount of an acid catalyst a molar amount of an olefinic aldehyde having the formula $C_nH_{2n-1} \cdot CHO$ wherein $n$ is a whole number from 2 to 6 with more than a molar amount of a monohydric phenol, said amount of phenol in the instance of a phenol having only one active nuclear position being at least 3 mols per mol of aldehyde and said amount of phenol in the instance of a phenol having more than one active nuclear position being at least about 5 mols per mol of aldehyde.

5. Process for preparing polyphenylol condensation products which comprises reacting in the presence of a catalytic amount of an acid catalyst a molar amount of an olefinic aldehyde having the formula $C_nH_{2n-1} \cdot CHO$ wherein $n$ is a whole number from 2 to 6 with a monohydric phenol having at least two active nuclear positions, by slowly adding the aldehyde to an amount of the phenol whereby the amount of phenol is at least about 5 mols per mol of aldehyde while the phenol is maintained at a temperature sufficient to cause a reaction between the phenol and aldehyde.

6. Process for preparing polyphenylol condensation products which comprises reacting together in the presence of a catalytic amount of an acid catalyst a molar amount of an olefinic aldehyde having the formula $C_nH_{2n-1} \cdot CHO$ wherein $n$ is a whole number from 2 to 6 and at least about 10 mols of a monohydric phenol having more than one active nuclear position per mol of aldehyde.

7. Process for preparing polyphenylol condensation products from monohydric phenols and olefinic aldehydes which comprises reacting together at a temperature up to about 100° C. in the presence of a catalytic amount of an acid catalyst a molar amount of an olefinic aldehyde having the formula $C_nH_{2n-1} \cdot CHO$ wherein $n$ is a whole number from 2 to 6 with more than a molar quantity of a monohydric phenol, said quantity of phenol in the instance of a phenol having only one active position being at least 3 mols per mol of aldehyde and said quantity of phenol in the instance of a phenol having more than one active position being at least about 5 mols per mol of aldehyde.

References Cited in the file of this patent

UNITED STATES PATENTS

| | | |
|---|---|---|
| 1,732,503 | Dachlauer et al. | Oct. 22, 1929 |
| 2,193,327 | Blass et al. | Mar. 12, 1940 |
| 2,559,347 | Dannenberg | July 3, 1951 |
| 2,683,130 | D'Alelio | July 6, 1954 |

FOREIGN PATENTS

| | | |
|---|---|---|
| 406,153 | Germany | Nov. 14, 1924 |
| 388,795 | Germany | Jan. 23, 1924 |

OTHER REFERENCES

Niederl et al.: Jour. Amer. Chem. Soc., vol. 63 (June 1941), pp. 1731–1733 (4 pages). Patent Off. Library.